April 6, 1965  P. J. SMITH  3,176,811
TORQUE RESPONSIVE CLUTCH DEVICE
Filed Aug. 9, 1960  5 Sheets-Sheet 1

FIG. 1

INVENTOR.
PAUL J. SMITH
BY *Walter E. Pavlick*
ATTORNEY

INVENTOR.
PAUL J. SMITH
BY Walter E. Pavlick
ATTORNEY

April 6, 1965  P. J. SMITH  3,176,811
TORQUE RESPONSIVE CLUTCH DEVICE
Filed Aug. 9, 1960  5 Sheets-Sheet 3

FIG. 4

INVENTOR.
PAUL J. SMITH
BY Walter E. Pavlick
ATTORNEY

FIG. 5

INVENTOR.
PAUL J. SMITH

United States Patent Office 3,176,811
Patented Apr. 6, 1965

3,176,811
TORQUE RESPONSIVE CLUTCH DEVICE
Paul J. Smith, Toledo, Ohio, assignor to Dana Corporation, Toledo, Ohio, a corporation of Virginia
Filed Aug. 9, 1960, Ser. No. 48,398
13 Claims. (Cl. 192—54)

This invention relates to clutches in general and more particularly to multiple disk friction clutches having self-energizing means for automatically increasing an initially applied clutch engagement force.

Prior constructions, such as the marine clutch disclosed in the E. A. Ewing Patent No. 1,120,044, dated December 8, 1914, have employed cooperating friction disks which are initially manually engaged and then pressed tighter together by axial movement of the drive shaft caused by the reactionary forces on the drive shaft propeller. With this construction it is necessary to have the drive shaft propeller immersed in water before a force will be supplied to increase the clutch engagement.

Other prior art devices have utilized intermeshing helical gear teeth for obtaining axial movement or thrust to press friction members together. In these latter devices selective operation is not possible since the transmission of torque in one direction automatically presses the friction members together whereas reversal of the torque effects a release of the friction members.

It is an object of this invention to supply a torque transmitting device having means in the device itself for increasing a clutch engagement force upon the transmission of torque through the device.

Another object of this invention is to provide thrust developing means for increasing the clutch engagement force on the clutch in proportion to the torque transmitted through the clutch.

Another object of this invention is to automatically increase an initially applied clutch engagement force in response to the transmission of torque in either direction through the torque transmitting device.

Still another object of this invention is to provide a pair of shiftable members, one being selectively movable to supply an initial clutch engagement force and the other being movable upon the engagement of the clutch to automatically increase the clutch engagement force.

A still further object of this invention is to provide a means selectively movable in a plurality of directions to cause engagement of one of a plurality of power transmitting clutches. The engagement force on the selected clutch is automatically increased upon the transmission of torque through the clutch.

In one preferred embodiment of this invention the torque transmitting device comprises a power shaft having a gear member freely rotatable thereon. The gear member carries friction clutch disks alternately arranged with friction clutch disks carried by an axially shiftable member. A selectively operable means in the form of a cam and ball is provided to supply an initial engagement force on the friction clutch disks to cause the gear member to rotate with the power shaft. The axially shiftable member is provided with helical gear teeth intermeshing with teeth carried by the power shaft so that upon transmission of torque between the gear member and the power shaft, the axially shiftable member will move to increase the clutch engagement force on the friction clutch disks in proportion to the torque transmitted.

These and other objects and advantages of this invention will become apparent upon reading the following detailed description when taken in connection with the accompanying drawings wherein.

Referring to the drawings and more particularly to FIGS. 1–4, the torque transmitting device indicated generally at 10 comprises a first torque transmitting member or power shaft 12 having a second torque transmitting member or drive gear 14 rotatably mounted thereon. The drive gear 14 is normally freely rotatable on the power shaft 12 and is constantly driven by means of a countershaft-mounted gear (not shown) meshing with drive gear 14. The drive gear 14 is provided with an axially extending hub 16 having external splines 18 meshing with internal splines 20 of an annular axially shiftable member 22. The axially shiftable member 22 is also provided with external splines having friction clutch disks 24 mounted thereon. The friction clutch disks 24 are alternately arranged with respect to friction clutch disks 26 movably keyed to a generally cylindrical-shaped axially shiftable member 28 which is carried by the power shaft 12 and positioned around the axially shiftable member 22. The axially shiftable member 22 is provided at one end with an outwardly extending annular flange or pressure plate 30 which is adapted to cause engagement of friction clutch disks 24 and 26 and compress the same against an annular raised portion 27 of drive gear 14.

Means is provided to selectively effect engagement of the friction clutch disks 24 and 26. More particularly, a series of axially extending circumferentially spaced slots 32 extend from one end of the axially shiftable member 28. The slots 32, in addition to providing keyways for the friction clutch disks 26 receive outwardly extending tangs 34 of a large Belleville spring 36 which is positioned adjacent to and has its inner circumference engaging the pressure plate 30 of the axially shiftable member 22. The axially shiftable member 28 has an inwardly extending annular body portion 38 concentric with power shaft 12 and is provided with a series of spaced, inwardly inclined chamfered surfaces or grooves 40. Each groove 40, together with the large Belleville disk or spring 36, forms a pocket which receives a ball member 42. A shift collar 44 having an annular groove 46 for receiving yoke arms of a shift fork (not shown) is arranged concentrically with the axially shiftable member 28. The internal portion of the shift collar 44 is provided with axially extending ball retaining surfaces 48, inwardly inclined cam surfaces 50, and axially extending locking surfaces 52.

It is now apparent that to clutch the drive gear 14 to the power shaft 12, the shift collar 44 is moved axially to the right causing the ball members 42 to be cammed radially inwardly along the inclined surface 40. As the ball members 42 move axially towards drive gear 14 the large Belleville spring or disk 36 biases the flange or pressure plate 30 of axially shiftable member 22 until the friction disks 24 and 26 bear against the raised annular surface 27 on the drive gear 14. Axial movement of the drive gear 14 is prevented by a snap ring 56 positioned on the power shaft 12. When the shift collar 44 is moved completely to the right to the position shown in FIG. 2 wherein the ball members 42 are cammed inwardly out of engagement with the cam surface 50 and into engagement with the locking surface 52, the large Belleville spring 36 becomes flattened and supplies an initial engagement force on the friction clutch disks 24 and 26.

Means is provided to increase the engagement force on the friction clutch disks 24 and 26 in proportion to the torque transmitted between drive gear 14 and the power shaft 12. To accomplish this, the annular body portion 38 of the axially shiftable member 28 is provided with cam means in the form of internal helical gear teeth 58 meshing with cam means in the form of helical gear teeth 60 carried by the power shaft 12. The helical gear teeth 60 are formed on a sleeve 62 suitably attached to the power shaft 12. A pair of small Belleville locating springs or washers 64 and 66 are retained on the sleeve 62 and engage the sides of the body portion 38 of the axially shiftable member 28 to centrally position the same.

Thus, upon the rotation of the drive gear 14 in one direction torque is transmitted through the clutch disks 24 and 26 to the power shaft 12 and the helical gear teeth 58 and 60 impart a thrust or camming movement to the axially shiftable member 28 against the bias of locating spring 66. The thrust of the axially shiftable member 28 is transferred through ball members 42 and the Belleville spring 36 to the pressure plate 30 which further compresses the friction clutch disks 24 and 26 against the raised surface 27 of the drive gear 14.

Figure 1:
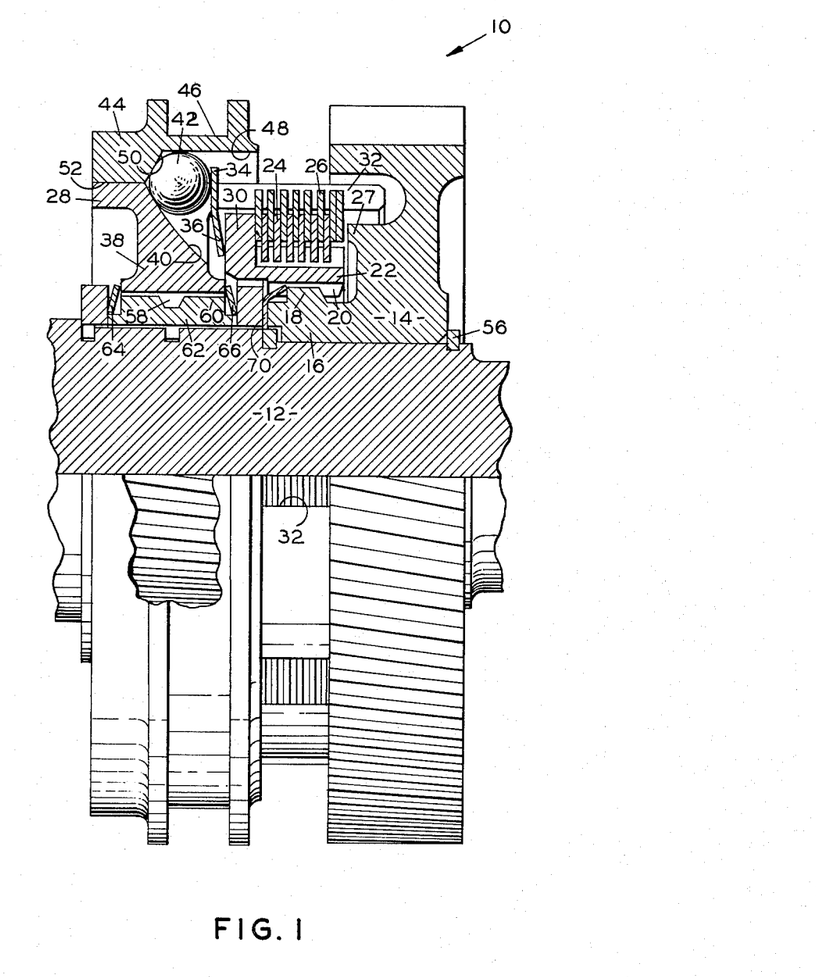
FIG. 1 is a partial longitudinal sectional view of the power transmitting device embodying this invention showing the clutch in disengaged position.
Figure 2:
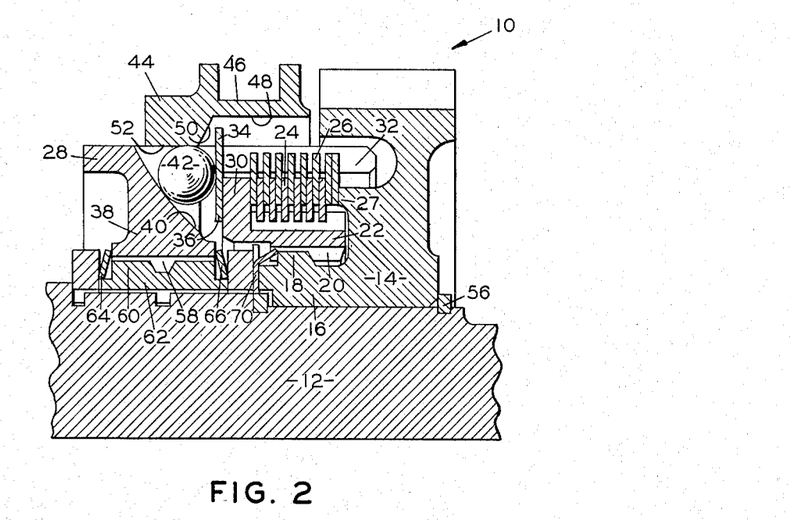
FIG. 2 is a longitudinal sectional view of the upper portion of the device of FIG. 1 with the clutch in engaged position.
Figure 3:
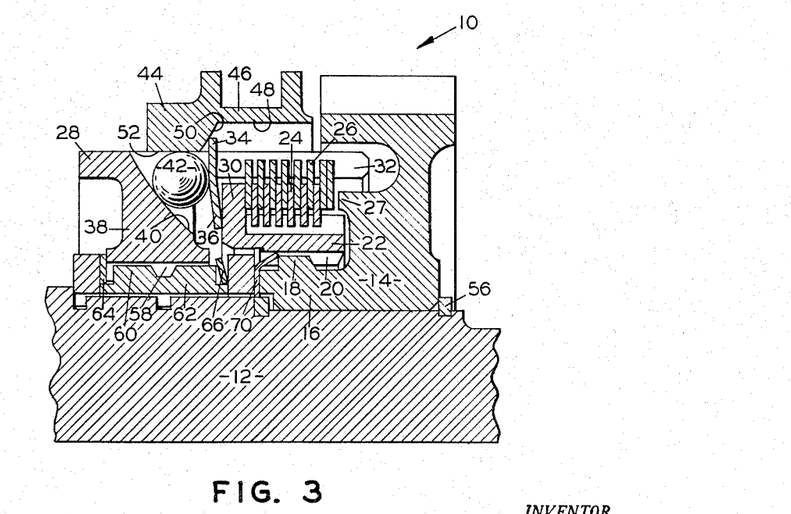
FIG. 3 is a view similar to FIG. 2 showing the clutch in its disengaged position when there is a reversal of torque through the power transmitting device.
Figure 4:
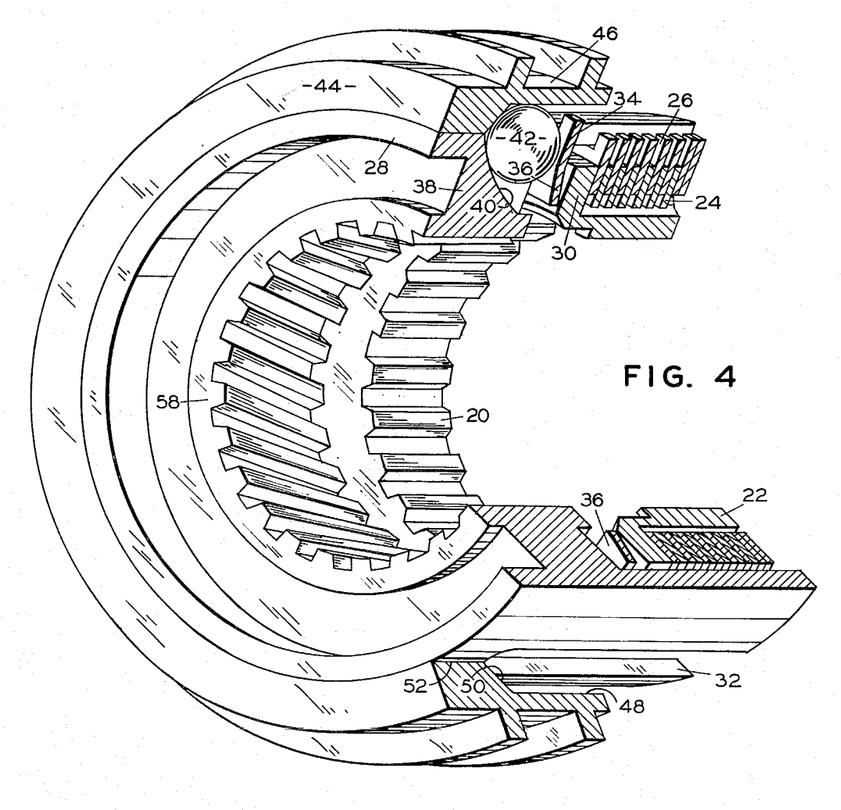
FIG. 4 is a perspective view of the device embodying this invention having a portion cut away to reveal the relationship of the parts.

If the direction of rotation of the drive gear 14 is reversed, the axially shiftable member 28 will be moved to the left by the helical gear teeth 58 and 60 to flatten the locating spring 64 instead of locating spring 66. This movement of the axially shiftable member 28 to the left releases the pressure on the ball members 42 which in turn permits the Belleville spring 36 to return to its arcuate configuration to effect disengagement of the friction clutch disks 24 and 26 from the drive gear 14. It should be noted that upon reversal of torque the friction clutch disks 24 and 26 become disengaged even though the ball members 42, as shown in FIG. 3, are in their depressed position; hence, a one-way clutch is provided.

Figure 5:
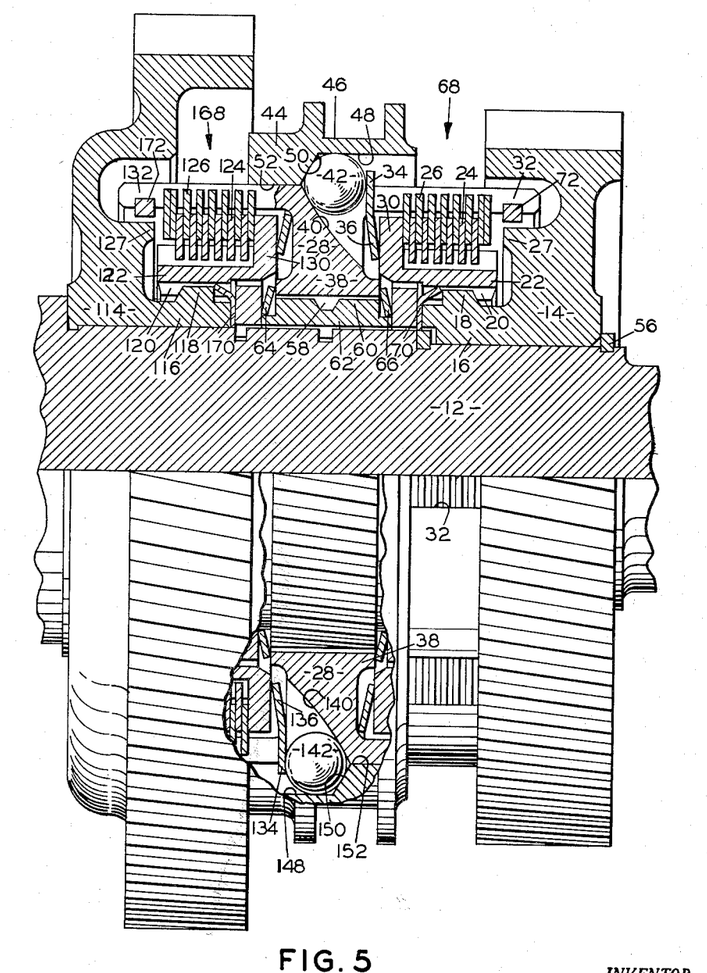
FIG. 5 is a partial longitudinal sectional view of another embodiment of this invention.

Reference will now be had to the embodiment of this invention shown in FIG. 5. Inasmuch as the clutch device on each side of the shift collar, as positioned in FIG. 5, comprises substantially identical structure, only one clutch device, indicated generally at 68, will be described; 100 has been added to the reference numerals to designate similar elements in the other clutch device, thus indicated generally at 168. Furthermore, since parts of the clutch device 68 correspond to parts hereinbefore described such corresponding parts will be given like reference numerals.

Due to the fact that this clutch device 68 is quite similar to that previously described and depicted in FIGS. 1 through 4, less detail will be required to describe the device 68 except where the two embodiments differ. Looking in detail at FIG. 5 it can be seen that the basic components of the power transmitting or clutch device 68, as in the case of the first embodiment, comprises a power shaft 12 having a constantly driven gear member 14 rotatably mounted thereon. External splines 18 are provided on a hub 16 of the gear member 14 which mesh with internal splines 20 of an axially shiftable member 22. The internal splines 20 are adapted to engage a stop washer 70 positioned on the power shaft 12 to limit leftward movement of the member 22. The axially shiftable member 22 carries a plurality of friction clutch disks 24 by means of external splines. The friction clutch disks 24 are alternately arranged with respect to friction clutch disks 26 movably keyed to a generally cylindrical-shaped axially shiftable member 28 which is positioned around the axially shiftable member 22. A pressure plate 30 is formed integral with the axially shiftable member 22 and is adapted to cause engagement of friction clutch disks 24 and 26 and compress the same against an annular raised portion 27 of the gear member 14.

Means is provided to selectively effect engagement of the friction clutch disks 24 and 26 or friction clutch disks 124 and 126. More particularly, a series of axially extending circumferentially spaced slots 32 and 132 extend inwardly from the opposite ends respectively of the axially shiftable member 28. The slots 32 and 132 form keyways for the friction clutch disks 26 and 126 and also for tangs 34 and 134 of large Belleville springs 36 and 136 which engage the pressure plates 30 and 130 respectively. The axially shiftable member 28 has a centrally disposed inwardly extending annular body portion 38 concentric with the power shaft 12. The body portion 38 is provided with a series of circumferentially spaced inwardly inclined chamfered surfaces or grooves 40 and 140. The grooves 40 are arranged alternately with respect to and are inclined inwardly in the opposite direction from the grooves 140. Ball members 42 and 142 are positioned in pockets fromed by the grooves 40 and 140 and their respective Belleville spring 36 and 136. A shift collar 44 provided with the conventional annular groove 46 for receiving yoke arms of a shift fork (not shown) is positioned around the axially shiftable member 28. The shift collar 44 is provided at its inner surface with axially extending ball retaining surfaces 48 and 148 and axially extending locking surfaces 52 and 152 interconnected by inwardly inclined cam surfaces 50 and 150. As shown in FIG. 5 the surfaces 48, 50, and 52 are alternately and oppositely positioned with respect to the surfaces 148, 150, and 152. These surfaces 48, 50, 52 and 148, 150, 152 are aligned respectively with the grooves 40 and 140 of the axially shiftable member so that upon movement of the shift collar 44 to the right the cam surface 50 will force the ball members 42 down the inclined grooves 40 whereas, upon movement of the shift collar 44 to the left, the came surfaces 150 will force the ball members 142 down the inclined grooves 140.

From the foregoing it is apparent that to clutch the drive gear 14 to the power shaft 12, the shift collar 44 is merely moved axially to the right causing the ball members 42, through the Belleville spring 36 and the pressure plate 30, to compress the friction clutch disks 24 and 26 against the raised portion 27 on the gear member 14. Axial movement of the gear member 14 is prevented by a snap ring 56 positioned on the power shaft 12. Likewise, to clutch the constantly driven gear member 114 to the power shaft 12 the shift collar 44 is merely moved to the left causing the ball members 142 by means of the Belleville spring 136 and the pressure plate 130 to compress the friction disks 124 and 126 against an annular raised portion 127 on the gear member 114.

Means is provided to increase the engagement force on the friction clutch disks of the selected clutch device 68 or 168 in proportion to the torque transmitted in either direction of rotation between the gear members 14 and 114 and the power shaft 12. To this end, internal helical gear teeth 58 are provided on the body portion 38 of axially shiftable member 28 and mesh with helical gear teeth 60 formed on a sleeve 62 suitably attached to the power shaft 12. A pair of small Belleville locating springs or washers 64 and 66 retained on the sleeve 62 engage and bias the body portion 38 of the axially shiftable member 28 to normally centrally position the same. The internal surface of each end of the axially shiftable member 28 is provided with an annular groove which receives a snap ring 72 and 172. The snap rings 72 and 172 are adapted to engage the friction clutch plates of their respective clutch devices 68 and 168 upon appropriate movement of the axially shiftable member 28 and thereby function as a pressure plate means.

Hence, assuming the shift collar 44 has been moved to the right to supply an initial clutch engagement force on the clutch device 68, the helical gear teeth 58 and 60 will impart a thrust or camming movement to the axially shiftable member 28 to the right to increase the engagement force on the clutch device 68 in proportion to the torque transmitted.

Now, assuming that the rotation of gear member 14 is reversed, the helical gear teeth 58 and 60 will impart a thrust or camming movement to the axially shiftable member 28 to the left. Upon this movement to the left the snap ring 72 carried by the axially shiftable member 28 engages the friction clutch disks 24 and 26 and slides them to the left until the internal splines 20 of the axially shiftable member 22 engage the stop washer 70, at which time the friction clutch disks 24 and 26 are compressed against the pressure plate 30.

Assuming the shift collar 44 has been moved to the left instead of the right, the operation is similar to that just described. The helical gear teeth 58 and 60 will move the axially shiftable member 28 to the right upon the transmission of torque to cause the snap ring 172 to pull the friction clutch disks 124 and 126 to the right and compress them against pressure plate 130. Upon reversal of torque the axially shiftable member 28 will be moved to the left carrying the ball members 142 and the Belleville spring 136 therewith to cause the pressure plate 130 to compress the friction clutch disks 124 and 126 against the annular raised portion 127 on gear member 112 to again increase the initially applied clutch engagement force in proportion to the torque transmitted.

Figure 6:
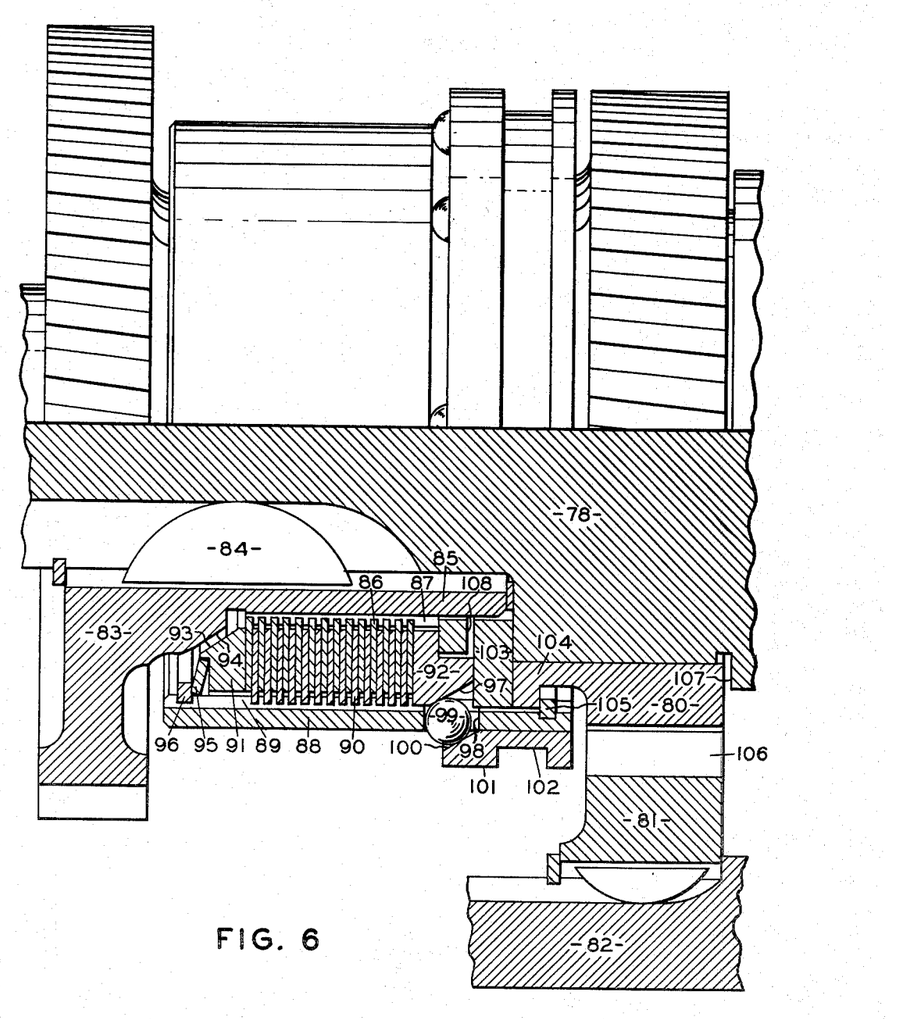
FIG. 6 is a partial longitudinal sectional view of still another embodiment of this invention.

Referring now to the embodiment of this invention shown in FIG. 6, a torque transmitting member or shaft 78 is provided with a torque transmitting member or drive gear 80 freely rotatable thereon. The drive gear 80 is constantly driven by a gear member 81 keyed to a countershaft 82.

Means is provided to clutch the drive gear 80 to the power shaft 78. More particularly, a gear member 83 is keyed to the power shaft 78 at 84 and has an elongated sleeve portion 85 extending towards the drive gear 80. The sleeve portion 85 of gear member 83 is provided with a series of friction clutch disks 86 splined thereto at 87. A cylindrical-shaped axially shiftable member 88 is arranged concentrically about power shaft 78 and is provided with internal splines 89 carrying friction clutch disks 90 which are alternately arranged with respect to the friction clutch disks 86. Axially shiftable means comprising a pair of annular members 91 and 92 positioned within and externally splined to the cylindrical member 88 is adapted to be movable to supply an engagement force on the friction clutch disks 86 and 90. The annular member 91 is positioned on one side of the friction clutch disks 86 and 90 and is provided with an annular bevel surface 93 which is adapted to co-act with a corresponding surface 94 formed on the gear member 83. A Belleville washer or spring 95 is positioned between the annular member 91 and a snap ring 96 located in an internal annular groove adjacent an end of the cylindrical member 88. The annular member 92 is positioned on the opposite side of the friction clutch disks 86 and 90 from the annular member 91 and is provided with an annular inclined cam surface 97 on the outer periphery thereof.

Means is provided to selectively apply an initial clutch engagement force on the friction clutch disks 86 and 90. To this end, the cylindrical-shaped member 88 is provided with a plurality of circumferentially spaced apertures 98 each adapted to receive a ball member 99. The ball members 99 are held in position in the apertures 98 by the cam surface 97 on the annular member 92 and an annular cam surface 100 provided on a shift collar 101 which is disposed around the cylindrical member 88. The shift collar 101 is provided with the conventional annular groove 102 which receives a shift fork (not shown).

Means is provided to increase the initially applied clutch engagement force in proportion to the torque transmitted. To accomplish this, a spacer ring 103 is provided adjacent the annular member 92 and has its external periphery splined to the cylindrical member 88. The drive gear 80 is provided with a hub portion 104 which is adapted to engage the spacer washer 103 and is also externally splined to the cylindrical member 88. A snap ring 105 is positioned in an annular groove situated adjacent the end of the cylindrical member 88 and is adapted to engage the hub portion 104 of drive gear 80 upon appropriate movement thereof. The drive gear 80 and the gear member 81 are provided with meshing helical gear teeth 106 so that when the gear member 81 and the drive gear 80 rotate, the drive gear 80 is shifted in an axial direction.

With the shift collar 101 in the position shown in FIG. 6 wherein the ball members 99 are located in their outer positions, the transmission of torque from the gear member 81 to the drive gear 80 will, by the action of the helical teeth 106, cause the drive gear 80 to move axially to the right until it engages a stop shoulder 107 on the power shaft 78. Upon the reversal of torque with the ball members still remaining in their outer position, the helical gear teeth 106 will cause movement of the drive gear 80 to the left until the spacer ring 103 movable therewith engages a stop washer 108 mounted for limited movement on sleeve 85 of gear member 83. It should be noted that the clearance is such that the spacer ring 103 will engage the stop washer 108 before the surface 93 of the annular member 91 engages the surface 94 on the gear member 83.

To clutch the drive gear 80 to the power shaft 78 the shift collar 101 is moved to the left forcing the ball members 99 radially inwardly against the cam surface 97 of the annular member 92. This causes the annular member 92, the friction clutch disks 86 and 90, and the annular member 91 to move axially to the left against the bias of Belleville spring 95 until the surface 93 on the annular member 91 engages the surface 94 of the gear member 83. As torque is transmitted from the gear member 81 to the drive gear 80, the helical gear teeth 106 exert an axial thrust or camming movement to the drive gear 80. If the rotation of the drive gear 80 and the gear member 81 is such that the helical gear teeth 106 cam the drive gear 80 axially to the left, the spacer ring 103 and the annular member 92 will be moved to the left to increase the engagement force on the friction clutch disks 86 and 90 by compressing the same against the annular member 91 which is held against axial movement by the engagement of surface 93 with surface 94. It should be noted that since the ball members 99 have been depressed inwardly, the clutch members will be fully engaged before the spacer ring 103 has moved to the left enough to engage the stop shoulder 108. Should the rotation of the gear member 81 and the drive gear 80 be such that the helical gear teeth 106 cam the drive gear 80 axially to the right, the hub portion 104 of the drive gear 80 will engage the snap ring 105 to pull the axially shiftable member 88 to the right. At the same time the snap ring 96 at the other end of the axially shiftable cylindrical member 88 acts through the Belleville spring 95 to pull the annual member 91 to the right and further compress the friction clutch disks 86 and 90 against the annular member 92. The axial movement of the annular member 92 and ball members 99 carried therewith is limited by engagement of spacer washer 103 with a shoulder on the power shaft 78. Accordingly, it is apparent that the initially applied clutch engagement force is automatically increased in proportion to the torque transmitted between the gear member 80 and the power shaft 78 in either direction.

It is apparent from the foregoing descriptions of the various embodiments of this invention that there may be many changes in structure as well as operation without departing from the scope of this invention as defined by the appended claims.

What I claim is:

1. In a torque transmitting device the combination comprising a pair of torque transmitting members, one of said torque transmitting members carrying friction clutch means, axially shiftable means carried by the other of said torque transmitting members and having friction clutch means adapted for engagement with the above said friction clutch means, means selectively operable to cause engagement of said friction clutch means to effect the transmission of torque between said members, and thrust developing means between said axially shiftable means and said other torque transmitting member and operable upon the transmission of torque between said members in one direction to cause movement of said axially shiftable means in a first axial direction for increasing the engagement force on said clutch means, said thrust developing means also being operable upon the reversal of torque between said torque transmitting members to cause movement of said axially shiftable means in an opposite axial direction for increasing the engagement force on said clutch means.

2. In a torque transmitting device the combination comprising a pair of torque transmitting members, a first axially shiftable means carried by one of said torque transmitting members and having friction clutch means, a second axially shiftable means carried by the other of said torque transmitting members and having friction clutch means adapted for engagement with the above said friction clutch means, means selectively operable to cause movement of said first axially shiftable means to effect engagement to said clutch means for the transmission of torque between said members, and intermeshing helical cam teeth connecting said second axially shiftable means with said other torque transmitting member whereby said second axially shiftable means moves in one axial direction upon the transmission of torque to cause movement of said first axially shiftable means to increase the engagement force on said friction clutch means and said second axially shiftable means moves in another axial direction upon the reversal of torque also to increase the engagement force on said clutch means.

3. A torque transmitting device comprising a first torque transmitting member, second and third torque transmitting members adapted to be connected to said first torque transmitting member and each carrying friction clutch means, a shiftable member carried by said first torque transmitting member and having friction clutch means adapted for engagement with the friction clutch means carried by said second and third torque transmitting members, means movable in one direction to cause engagement of the friction clutch means of said shiftable member with the friction clutch means of said second torque transmitting member to effect the transmission of torque between said first and second torque transmitting members and movable in another direction to cause engagement of the friction clutch means of said shiftable member with the friction clutch means carried by said third torque transmitting member to effect the transmission of torque between said first and third torque transmitting members, and thrust developing means between said first torque transmitting member and said shiftable member operable upon the transmission of torque in either direction to effect movement of said shiftable member to increase the clutch engagement force on the engaged friction clutch means.

4. A torque transmitting device comprising a first torque transmitting member, second and third torque transmitting members adapted to be selectively connected to said first torque transmitting member and each carrying friction clutch means, an axially shiftable member carried by said first torque transmitting member and having friction clutch means adapted for engagement with the friction clutch means carried by said second and third torque transmitting members, selectively operable means movable in one direction to cause engagement of the friction clutch means of said shiftable member with the friction clutch means of said second torque transmitting member to effect the transmission of torque between said first and second torque transmitting members and movable in another direction to cause engagement of the friction clutch means of said shiftable member with the friction clutch means carried by said third torque transmitting member to effect the transmission of torque between said first and third torque transmitting members, and intermeshing helical cam teeth between said axially shiftable member and said first torque transmitting member causing movement of said axially shiftable member upon the transmission of torque to increasse the clutch engagement force on the selectively engaged friction clutch means, and means on said axially shiftable member engageable with the engaged friction clutch means to increase the clutch engagement force on said friction clutch means upon reversal of the torque.

5. In a torque transmitting device the combination comprising a pair of torque transmitting members, a friction clutch means adapted to be operably connected to each of said members and disposed in cooperable relationship, one of said members being operative to impose an engaging force to said friction clutch means and being axially shiftable in one direction in response to the transmission of torque in a first direction to impose an engaging force to said friction clutch means and axially shiftable in the opposite direction in response to the transmission of torque in the opposing direction to also impose an engaging force to said friction clutch means, selectively operable means having an inoperative position and an operative position and being operable in said operative position to cause initial engagement of said friction clutch means to effect the transmission of torque between said members, and thrust developing means operable when said selectively operable means is in said operative position and upon the transmission of torque between said members in either direction to cause movement of said axially shiftable member in its respective direction for increasing the engagement force on said clutch means in proportion to the transmitted torque.

6. A device for connecting a first and a second relatively rotatable member for unitary rotation comprising clutch means operatively connected to said members and including a pressure plate, manually operable means including a first movable means operatively engaging said pressure plate and adapted to cause initial clutch engagement, a second movable means carried by one of said members and engaging said first movable means, cam means including first cam means carried by said one member and second cam means carried by said second movable means and being operatively associated with said first cam means, said cam means being operable in response to initial clutch engagement to move said second movable member for increasing the clutch engagement force.

7. A device for connecting an input member and an output member together for unitary rotation in forward and reverse directions comprising clutch means operatively connected to said input and output members and including a pressure plate, manually operable means including a first movable member engageable with said pressure plate to cause initial clutch engagement, a second movable member operatively engaging said first movable member and being movable in alternate directions, cam means associated with said second movable member and operable in response to initial clutch engagement to move said second movable member in one of said alternate directions for increasing the clutch engagement force upon the transmission of torque between said input and output members in a forward direction, and means including said cam means associated with said second movable member and said clutch means and operable in response to initial clutch engagement to move said second movable member in the other of said alternate directions to increase the clutch engagement force upon the transmission of torque between said input and output members in the reverse direction.

8. A device for connecting first and second relatively rotatable members in a torque transmitting relationship comprising clutch means operatively connected to said members and including a pressure plate, means for initially urging said pressure plate to cause initial clutch engagement, an axially movable member carried by one of said rotating members and being movable in alternate axial directions, said movable member being adapted to cooperate with said initial urging means to cause further movement of said pressure plate, cam means associated with said movable member and operable in response to initial clutch engagement to move said movable member in one of said alternate axial directions for increasing the clutch engagement force upon the transmission of torque between said rotatable members in a forward direction, and means including said cam means associated with said movable member and said clutch means and operable in response to initial clutch engagement to move said movable member in the other of said alternate axial directions to increase the clutch engagement force upon the transmission of torque between said rotatable members in the reverse direction.

9. A device for connecting a gear member to a shaft member for unitary rotation comprising clutch means operatively connected to said members and including a pressure plate, manually operable means including a first movable means for initially urging said pressure plate to cause initial clutch engagement, a second movable means carried by said shaft member and being movable in alternate axial directions relative thereto, said second movable means being adapted to cooperate with said first movable means to cause further movement of said pressure plate, a first cam means carried by said shaft member, a second cam means carried by said second movable means and being operatively associated with said first cam means, said cam means being operable after initial clutch engagement and in response to the transmission of torque between said members in a forward direction to move said second movable means relative to said shaft member for increasing the clutch engagement force, and means including said cam means and said second movable means associated with said clutch means and operable in response to initial clutch engagement to move said second movable means in the other of said alternate directions to increase the clutch engagement force upon the transmission of torque between said members in the reverse direction.

10. A device for connecting first and second relatively rotatable members comprising clutch means operatively connected to one of said members and including a pressure plate, manually operable means including a first movable member operatively connected to said pressure plate to cause initial clutch engagement, a second movable member engaging said first movable member and having helical cam teeth thereon, and helical cam teeth carried by the other of said relatively rotatable members and cooperative with the first helical cam teeth for transmitting the entire torque between said members whereby upon initial clutch engagement torque is transmitted from one of said members to the other through said helical cam teeth and said helical cam teeth are operative to effect increased clutch engagement in proportion to the torque transmitted.

11. A device for drivingly connecting a first member to a second member comprising in combination, clutch means operatively connected to said members and including a first and a second pressure plate means, said first pressure plate means having a disengaged position and being movable in a first direction to an engaged position to cause engagement of said clutch means, means maintaining said first pressure plate means from moving from said disengaged position in a direction opposite to said first direction, said second pressure plate means being movable in a direction opposite to said first direction and adapted to engage said clutch means against said first pressure plate means, and axially shiftable means carried by one of said members and operatively associated with both of said pressure plate means, means carried by one of said members and said shiftable means for urging said shiftable means in said first direction in response to torque transfer between said members and in a direction opposite said first direction in response to torque transfer between said members in the opposite direction, said shiftable member being adapted to carry said first pressure plate means in said first direction and to carry said second pressure plate means in said opposite direction whereby said shiftable means urges an engagement force on said clutch means upon the transfer of torque between said members in either direction.

12. A device for connecting a gear member and a shaft member in a torque transferring relationship comprising in combination, an axially movable means carried by one of said members and carrying a first friction element thereon for unitary rotation and axial movement relative thereto, a second friction element carried by the other of said members for unitary rotation and axial movement relative thereto and being in a cooperative relationship with said first friction element, said friction elements being adapted to be urged axially into engagement with each other, a first pressure plate means having a disengaged position and being movable in a first axial direction to an engaged position to cause engagement of said friction elements, means maintaining said first pressure plate means from moving from said disengaged position in a second direction opposite to said first direction, a second pressure plate means being movable in said second direction and adapted to urge said friction elements into engagement with said first pressure plate means, a manually operable means having an inoperative and operative positions and being movable to said operative position for initially urging said first pressure plate means in said first direction to its engaged position to cause initial engagement of said first elements, said axially movable means being movable in said first axial direction and cooperable with said manually operable means in its said operative position to cause further movement of said first pressure plate means in said first direction to cause further engagement of said friction elements and being movable in said second direction and being operatively connected to said second pressure plate means and adapted to move the same in said second direction when said manually operable means is in its said operative position and to urge said friction elements against said first pressure plate means to cause further engagement thereof, and cooperable cam means carried by said one member and said axially movable means and being operable to urge said axially movable means in said first direction upon the transmission of torque between said members in one direction and to urge said axially movable means in said second direction upon the transmission of torque in a direction opposite to said one direction, whereby said axially movable means is operable to cause additional engagement of said friction elements upon the transmission of torque between said members in either direction when said manually operable means is in its said engaged position.

13. In a torque transmitting device the combination comprising a pair of rotary torque transmitting members adapted to transmit torque in a first direction of rotation and in the direction of rotation opposite to said first direction, one of said torque transmitting members carrying a friction clutch means, axially shiftable means including thrust developing means carried by the other of said torque transmitting members and having friction clutch means adapted for engagement with said first mentioned friction clutch means, said axially shiftable means being movable in one axial direction in response to the transmission of torque by said members in a first direction of rotation and being movable in the opposite axial direction in response to the transmission of torque by said members in the opposite direction of rotation, and selectively movable means having an inoperative position and an operative position and being operable in said operative position to cause engagement of said friction clutch means to effect the transmission of torque between said members, said thrust developing means being operable when said selectively operable means is in said operative position and upon the transmission of torque between said members in either direction of rotation to cause movement of said axially shiftable means for increasing the engagement force on said clutch means in proportion to the transmitted torque.

References Cited by the Examiner
UNITED STATES PATENTS

| | | | |
|---|---|---|---|
| 1,654,911 | 1/28 | Bartholomew | 192—54 |
| 1,841,284 | 1/32 | Gillet | 192—54 |
| 2,126,760 | 8/38 | Eason | 192—32 X |
| 2,138,129 | 11/38 | Wolfram | 192—36 |
| 2,248,134 | 7/41 | Snow | 192—54 X |
| 2,626,692 | 1/53 | Sloan | 192—54 X |
| 2,702,107 | 2/55 | Hahn | 192—54 X |
| 2,729,980 | 1/56 | Sammerz et al. | 192—481 |
| 2,787,341 | 4/57 | Merritt | 192—54 X |
| 2,799,375 | 7/57 | Forster | 192—54 X |
| 2,856,048 | 10/58 | Carlson | 192—48 |

FOREIGN PATENTS

| | | |
|---|---|---|
| 367,032 | 8/06 | France. |
| 536,334 | 5/41 | Great Britain. |
| 291,589 | 9/53 | Switzerland. |

OTHER REFERENCES 1,081,772, May 12, 1960, German printed application (Rambausek).

References Cited by the Applicant
FOREIGN PATENTS

| | | |
|---|---|---|
| 274,955 | 4/51 | Switzerland. |

DAVID J. WILLIAMOWSKY, *Primary Examiner.*

THOMAS J. HICKEY, *Examiner.*